(12) United States Patent
Kim

(10) Patent No.: US 10,013,350 B2
(45) Date of Patent: Jul. 3, 2018

(54) DATA STORAGE DEVICE AND OPERATING METHOD THEREOF

(71) Applicant: SK hynix Inc., Gyeonggi-do (KR)

(72) Inventor: Se Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 294 days.

(21) Appl. No.: 14/924,481

(22) Filed: Oct. 27, 2015

(65) Prior Publication Data

US 2016/0371195 A1 Dec. 22, 2016

(30) Foreign Application Priority Data

Jun. 22, 2015 (KR) .................. 10-2015-0088285

(51) Int. Cl.
 *G06F 12/02* (2006.01)
 *G06F 12/06* (2006.01)
 *G06F 3/06* (2006.01)

(52) U.S. Cl.
 CPC .......... *G06F 12/0653* (2013.01); *G06F 3/061* (2013.01); *G06F 2212/1016* (2013.01)

(58) Field of Classification Search
 CPC ............. G06F 12/0261; G06F 12/1009; G06F 2212/1016; G06F 2212/7211; G06F 2212/7205; G06F 2212/1306; G06F 2212/2022; G06F 3/0679; G06F 3/064; G06F 3/0616; G06F 3/0652; G06F 3/0688; G06F 3/061
 See application file for complete search history.

(56) References Cited

U.S. PATENT DOCUMENTS

| 9,465,732 | B2* | 10/2016 | Manohar | ............. G06F 12/0246 |
| 2011/0010489 | A1 | 1/2011 | Yeh | |
| 2013/0021846 | A1* | 1/2013 | Rao | ..................... G11C 16/3495 365/185.03 |
| 2014/0143474 | A1* | 5/2014 | Damle | ................ G06F 12/0246 711/103 |
| 2015/0134885 | A1* | 5/2015 | Yeung | ................ G06F 12/0246 711/103 |

FOREIGN PATENT DOCUMENTS

KR 1020140114618 9/2014

\* cited by examiner

*Primary Examiner* — Hiep Nguyen
(74) *Attorney, Agent, or Firm* — IP & T Group LLP

(57) ABSTRACT

A data storage device includes a plurality of logical regions that form n number of logical zones, each including k number of logical regions, wherein the plurality of logical regions are grouped into k number of logical region groups based on their offset values; and a processor suitable for, when receiving a write request for a target logical region, increasing a first access count stored in a first entry of a first table, corresponding to a logical zone including the target logical region, and increasing a second access count stored in a second entry of a second table, corresponding to a logical region group including the target logical region.

23 Claims, 9 Drawing Sheets

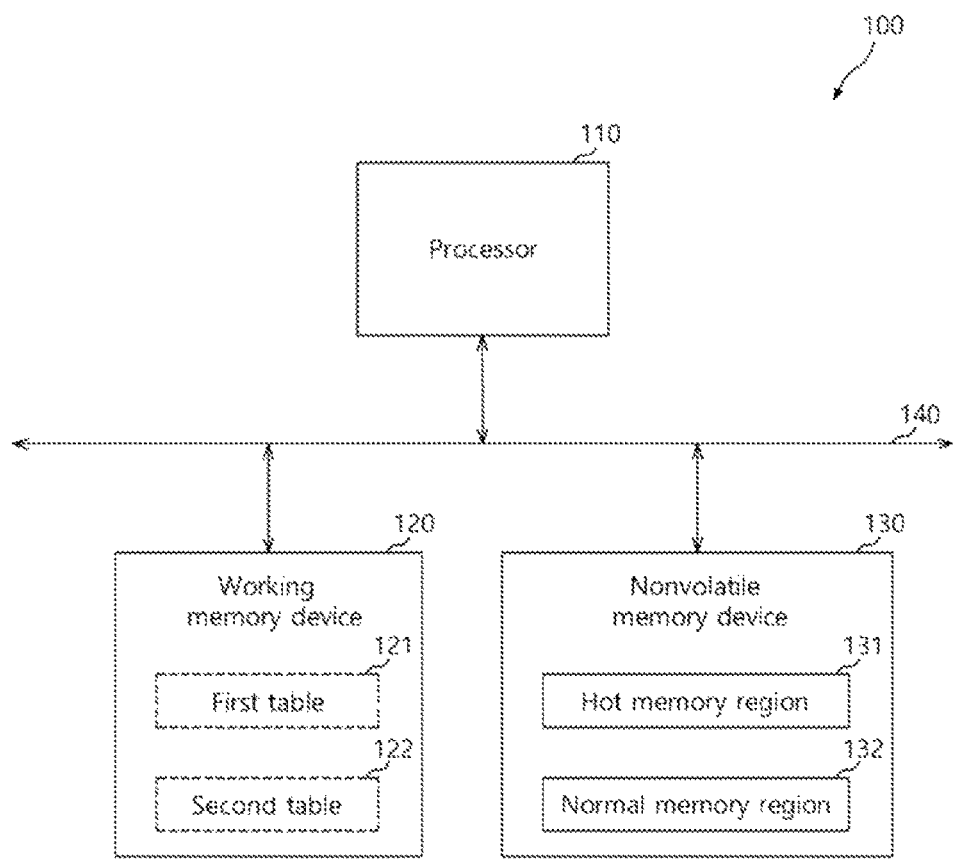

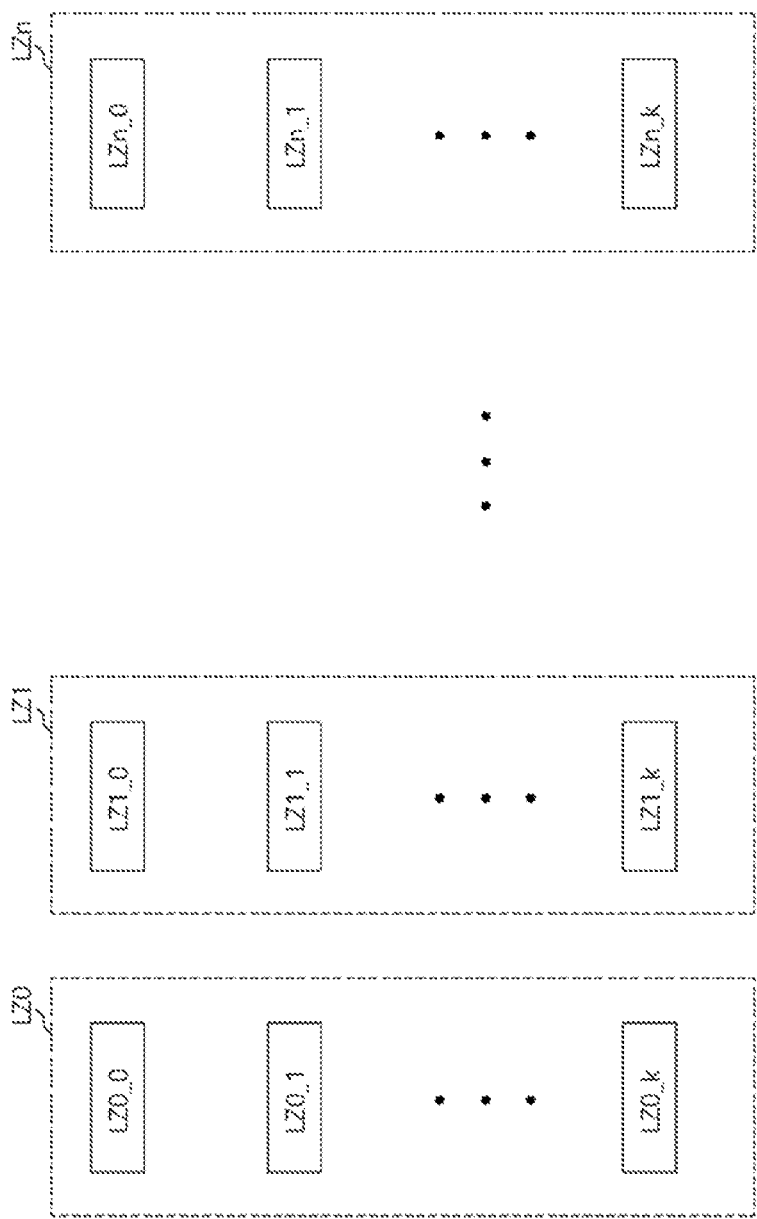

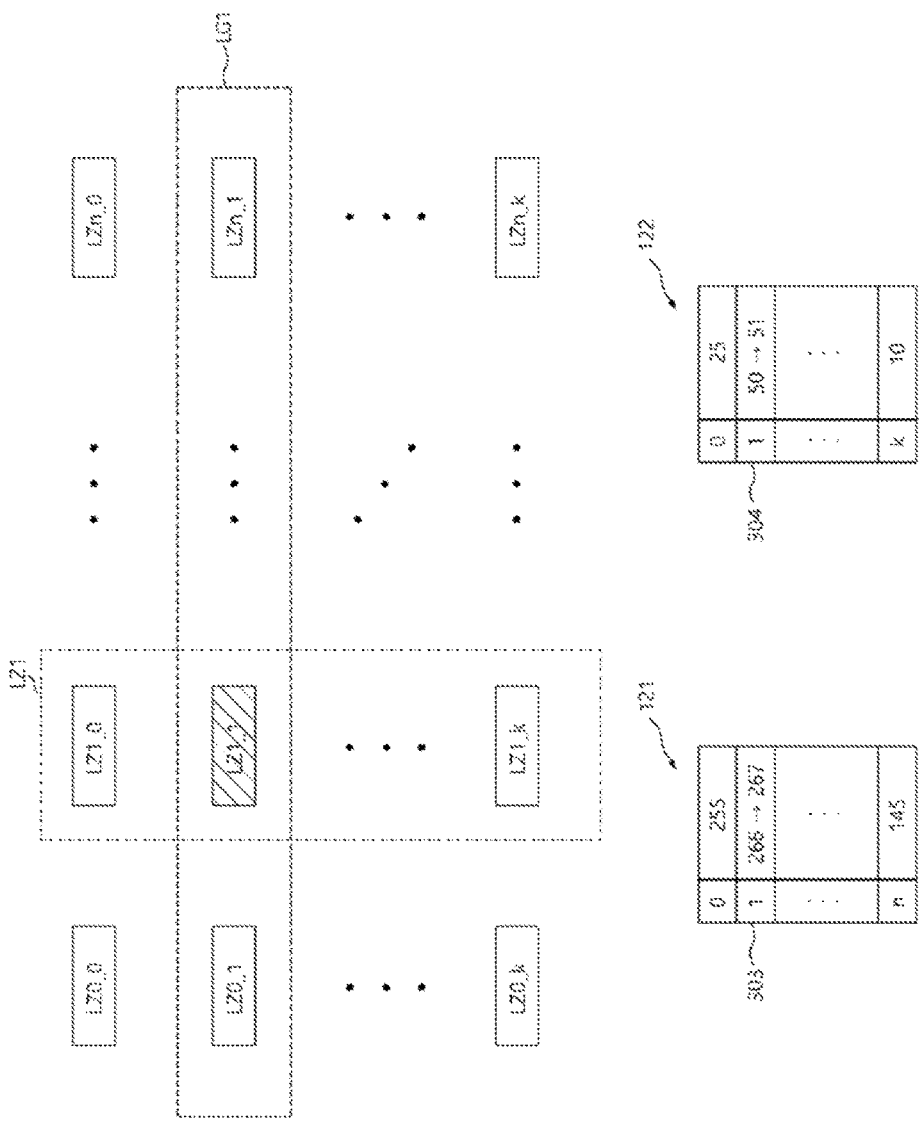

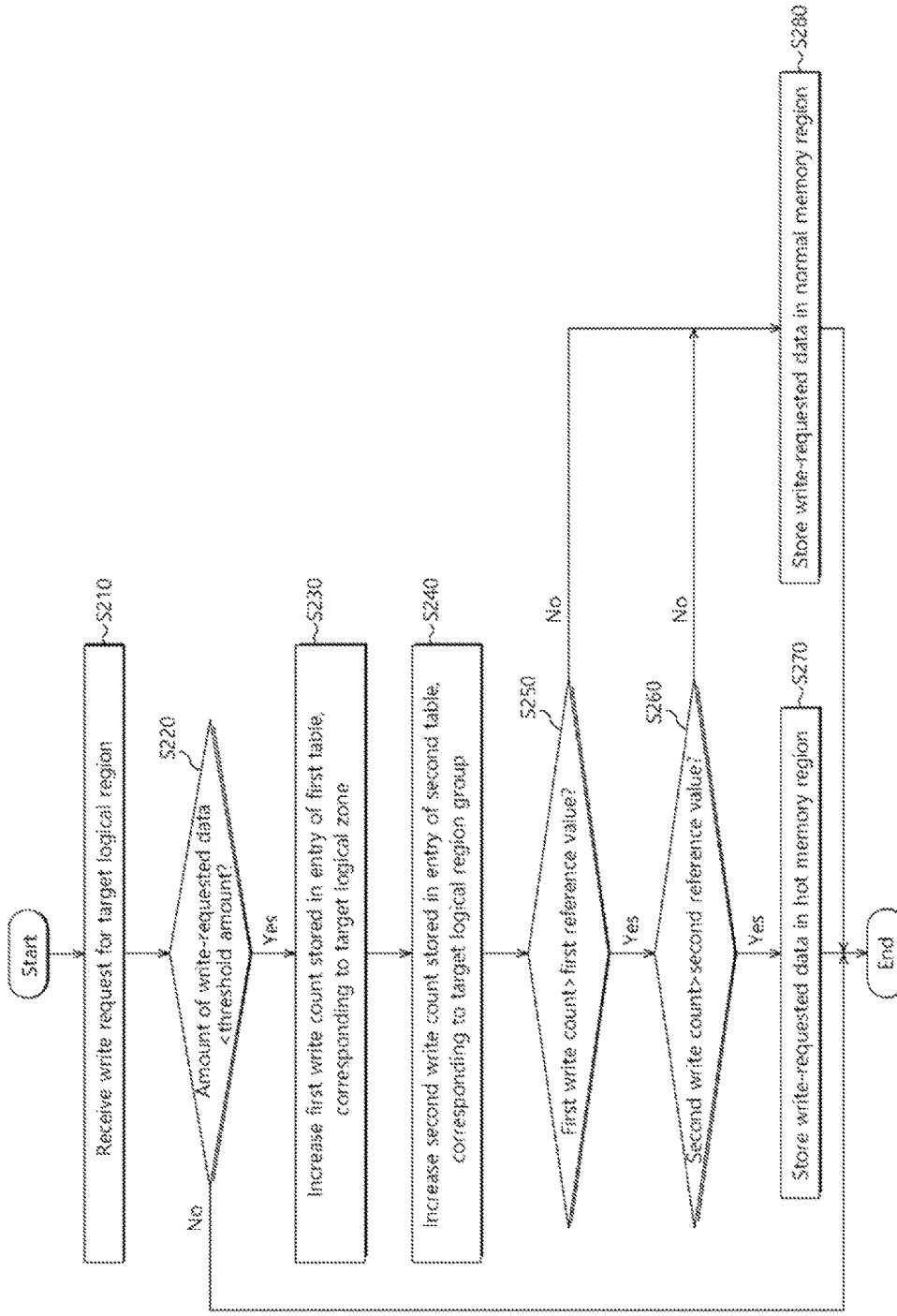

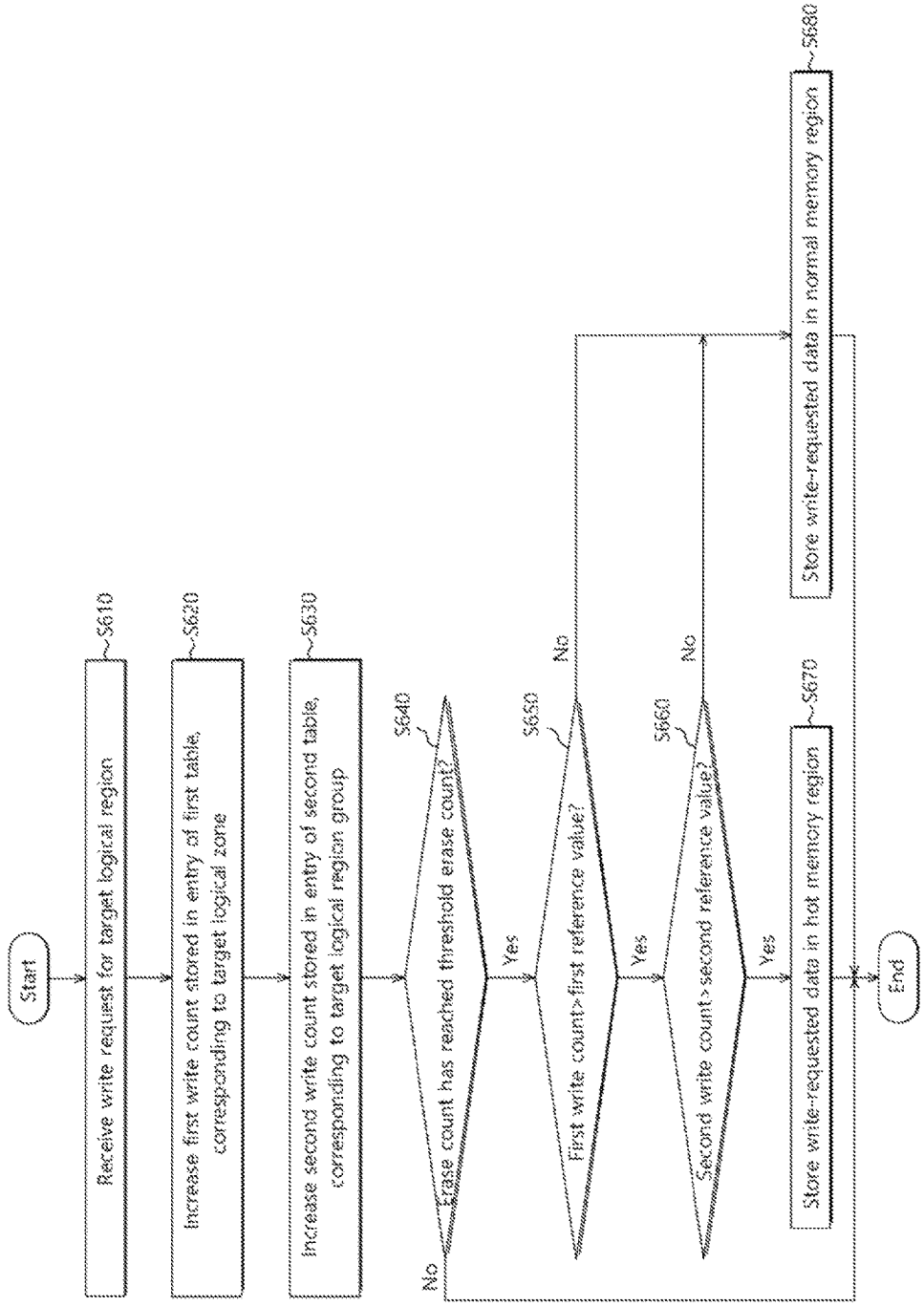

DATA STORAGE DEVICE AND OPERATING METHOD THEREOF

CROSS-REFERENCES TO RELATED APPLICATION

The present application claims priority under 35 U.S.C. § 119(a) to Korean application number 10-2015-0088285, filed on Jun. 22, 2015, which is incorporated herein by reference in its entirety.

BACKGROUND

1. Technical Field

Various embodiments of the present invention relate to a data storage device, and, more particularly, to write count management of a data storage device.

2. Related Art

A data storage device stores data provided from an external device in response to a write request from the external device. The data storage device also provides the external device with stored data in response to a read request from the external device. The external device is an electronic device capable of processing data, and may be a computer, a digital camera, a cellular phone and the like. The data storage device may be embedded in the external device, or may be fabricated separately and then coupled to the external device.

The data storage device may be prepared in the form of a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid-State Drive (SSD) and the like.

The data storage device may include a nonvolatile memory device to store data. The nonvolatile memory device may retain stored data even without a constant source of power. The nonvolatile memory device may be a flash memory such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory Jo (ReRAM), and the like.

SUMMARY

In an embodiment, a data storage device may include: a plurality of logical regions that form n number of logical zones, each including k number of logical regions, wherein the plurality of logical regions are grouped into k number of logical region groups based on their offset values; and a processor suitable for, when receiving a write request for a target logical region, increasing a first access count stored in a first entry of a first table, corresponding to a logical zone including the target logical region, and increasing a second access count stored in a second entry of a second table, corresponding to a logical region group including the target logical region.

In an embodiment, a method for operating a data storage device including a plurality of logical regions that form n number of logical zones, each including k number of logical regions, and are grouped into k number of logical region groups based on their offset values, the method comprising: receiving a write request for a target logical region; increasing a first access count stored in an entry of a first table, corresponding to a logical zone including the target logical region; and increasing a second access count stored in an entry of a second table, corresponding to a logical region group including the target logical region.

In an embodiment, a data storage device may include: a nonvolatile memory having a plurality of memory regions; a working memory having first and second tables including address mapping information on the memory regions, wherein a plurality of logical regions form n number of logical zones each including k number of logical regions and are grouped into and k number of logical region groups based on their offset values, and wherein the first table includes a plurality of entries corresponding to the logical zones and the second table includes a plurality of entries corresponding to the logical region groups; and a processor suitable for managing the memory regions based on logical addresses and physical addresses, and mapping a logical address onto a physical address of a memory region, wherein, when receiving a write request for a target logical region, the processor increases a first access count stored in the first entry of a first table, corresponding to a logical zone including the target logical region, and increases a second access count stored in a second entry of a second table, corresponding to a logical region group including the target logical region.

BRIEF DESCRIPTION OF THE DRAWINGS

FIG. 1 is a block diagram illustrating a data storage device in accordance with an embodiment of the present invention.

FIGS. 2A and 2B are diagrams illustrating logical regions identified based on logical addresses.

FIGS. 3A and 3B are diagrams for describing an operation of a processor shown in FIG. 1.

FIG. 4 is a flow chart for describing an operation of the data storage device shown in FIG. 1.

FIG. 5 is a flow chart for describing an operation of the data storage device shown in FIG. 1.

FIG. 9 is a flow chart for describing the data storage device shown in FIG. 1.

DETAILED DESCRIPTION

Figure 2B:
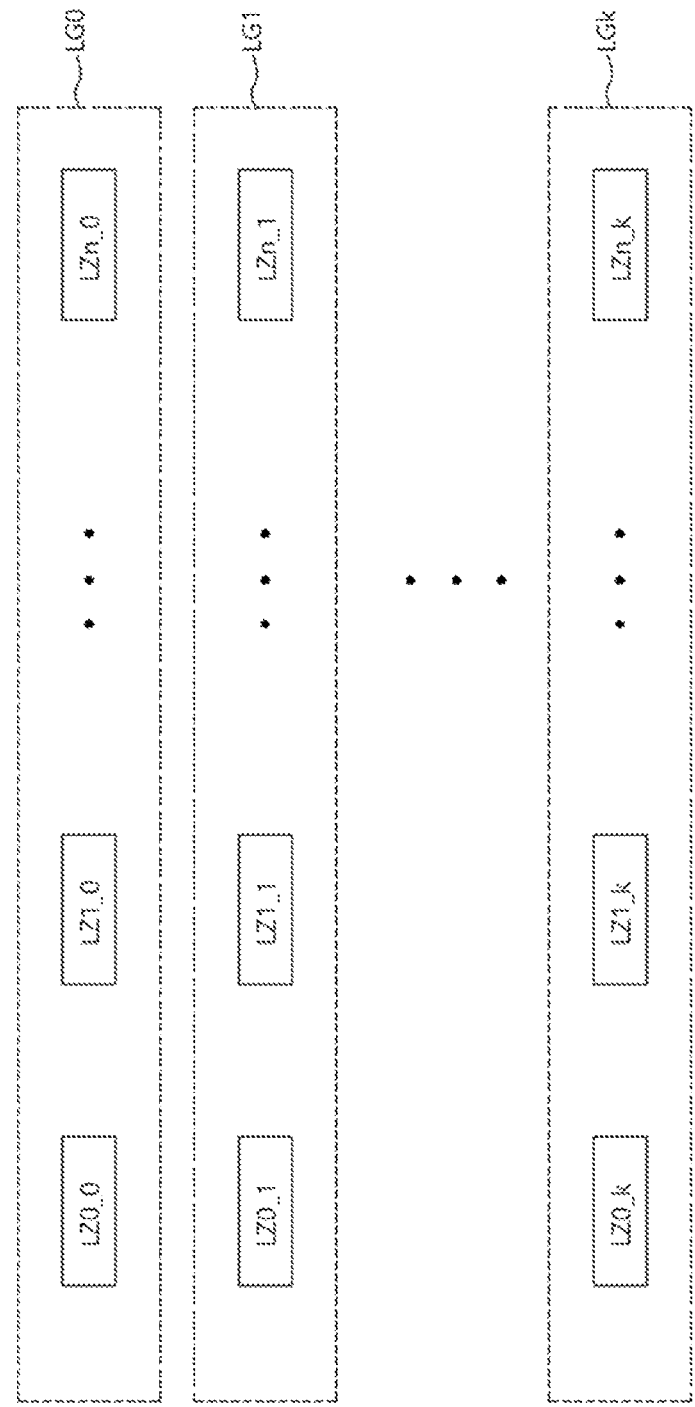

Hereinafter, a data storage device and an operating method thereof according to the present invention will be described with reference to the accompanying drawings through exemplary embodiments. The present invention may, however, be embodied in different forms and should not be construed as limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology is for describing particular embodiments only and is not intended to limit the scope of the present invention.

In this disclosure, when one part is referred to as being 'connected' to another part, it should be understood that the former can be 'directly connected' to the latter, or 'electrically connected' to the latter via an intervening part. Furthermore, when it is described that one comprises (or includes or has) some elements, it should be understood that it may comprise (or include or has) only those elements, or it may comprises (or includes or have) other elements as well as those elements if there is no specific limitation. The terms of a singular form may include plural forms unless stated otherwise.

FIG. 1 is a block diagram illustrating a data storage device 100 in accordance with an embodiment of the present invention.

Referring to FIG. 1, the data storage device 100 may include a processor 110, a working memory device 120, and a nonvolatile memory device 130. The processor 110, the working memory device 120 and the nonvolatile memory device 130 may exchange signals and data through a transmission line (e.g., a bus line) 140.

The processor 110 may control the general operations of the data storage device 100. The processor 110 may control the nonvolatile memory device 130 to write or read data according to an access request transmitted from an external device, for example, a write request or a read request. The processor 110 may transmit a write command or a read command to the nonvolatile memory device 130 to control a write operation and a read operation of the nonvolatile memory device 130. The processor 110 may store various programs and data used to control the data storage device 100, in the working memory device 120.

The processor 110 may manage the memory regions included in the nonvolatile memory device 130, based on logical addresses and physical addresses. Logical addresses may be references for the external device to identify the memory regions. Physical addresses may be references for the data storage device 100 to identify the memory regions, and be the actual addresses of the memory regions. When a write request for a logical address is received from the external device, the processor 110 may map the received logical address onto the physical address of a memory region where data is to be written. Since the nonvolatile memory device 130 may not perform overwriting, when a new write request for the overlapping logical address is received to update data, the processor 110 may newly map the logical address onto the physical address of a new memory region where updating data is to be written.

FIGS. 2A and 2B are diagrams illustrating logical regions LZ0_0 to LZn_k identified based on logical addresses (where n and k are natural numbers, respectively). The logical regions LZ0_0 to LZn_k may respectively correspond to differential logical addresses.

The logical regions LZ0_0 to LZn_k may be the memory structure of the nonvolatile memory device 130 of FIG. 1 when viewed from the external device. Accordingly, the logical regions LZ0_0 to LZn_k may be variably mapped onto the physical memory Jo regions of the nonvolatile memory device 130. For example, when currently stored data is updated, the logical region LZ0_0 may be mapped onto a physical region different from a physical region to which the logical region LZ0_0 is mapped before being updated.

FIGS. 2A and 2B show methods in which the logical regions LZ0_0 to LZn_k are managed by different units, that is, logical zone LZ (see FIG. 2A) and logical region group LG (see FIG. 2B).

Referring to FIG. 2A, the logical regions LZ0_0 to LZn_k may be managed by the unit of logical zone LZ. Each of n+1 number of logical zones LZ0 to LZn may include k+1 number of logical regions. For example, the logical zone LZn may include k+1 number of logical regions LZn_0 to LZn_k. In each of the n+1 number of logical zones LZ0 to LZn, the k+1 number of logical regions may have a constant offset value. For example, in the logical zone LZn, the logical region LZn_0 may have the offset value of '0', the logical region LZn_1 may have the offset value of '1', and the logical region LZn_k may have the offset value of 'k'.

Referring to FIG. 2B, the logical regions LZ0_0 to LZn_k may be managed in units of logical region groups LG. The logical regions LZ0_0 to LZn_k may be grouped into k+1 number of logical region groups LG0 to LGk according to their offset values. In other words, logical regions having the same offset value may be grouped into one logical region group LG. For example, the logical regions LZ0_0 to LZn_0 having the offset value of '0' may be grouped into the logical region group LG0, the logical regions LZ0_1 to LZn_1 having the offset value of '1' may be grouped into the logical region group LG1, and the logical regions LZ0_k to LZn_k having the offset value of 'k' may be grouped into the logical region group LGk.

Referring back to FIG. 1, the processor 110 may receive a write request for a specified logical region, i.e., a target logic region. The target logical region corresponds to the logical address included in the write request. The processor 110 may count the number of write operations on the target logical region, in different units, that is, by the unit of logical zone LZ and by the unit of logical region group GL, and manage it through a first table 121 and a second table 122.

When a write request for a target logical region is received, the processor 110 may increase a first write count which is stored in an entry of the first table 121, corresponding to a logical zone including the target logical region, i.e., a target logical zone. The first table 121 may include n+1 number of entries respectively corresponding to the n+1 number of logical zones LZ0 to LZn. The first table 121 may include write counts which are counted by the unit of logical zone LZ, for the logical regions LZ0_0 to LZn_k.

Further, when the write request for the target logical region is received, the processor 110 may increase a second write count which is stored in an entry of the second table 122, corresponding to a logical region group including the target logical region, i.e., a target logical region group. The second table 122 may include k+1 number of entries respectively corresponding to the k+1 number of logical region groups LG0 to LGk. The second table 122 may include write Jo counts which are counted by the unit of logical region group LG for the logical regions LZ0_0 to LZn_k.

The processor 110 may determine whether a first write count of a target logical zone exceeds a first reference value. Further, the processor 110 may determine whether a second write count of a target logical region group exceeds a second reference value. When it is determined that the first write count exceeds the first reference value and the second write count exceeds the second reference value, the processor 110 may determine the data write-requested with respect to the target logical region, as hot data. Otherwise, when it is determined that the first write count exceeds the first reference value and the second write count exceeds the second reference value, the processor 110 may determine a logical address corresponding to the target logical region, as a hot logical address.

The processor 110 may store the data determined as hot data, in a hot memory region 131 of the nonvolatile memory device 130.

Since a write request for hot data is transmitted more frequently when compared to a write request for data other than hot data, that is, normal data, hot data may be updated frequently. When hot data is updated, hot data of a previous version is invalidated. Accordingly, the invalidation of the hot memory region 131 where hot data is stored may quickly progress. Therefore, storing hot data in the hot memory region 131 may contribute to saving of a garbage collection cost. Namely, while the garbage collection cost includes a cost for copying valid data from a memory block to be erased to another memory block, since a memory block to be erased in the hot memory region 131 has a high degree of invalidation, the cost for copying valid data may not necessary.

According to an embodiment of the present invention, the hot memory region 131 may be a region which is quickly accessible. For example, the hot memory region 131 may include single level memory cells each storing 1-bit data. Therefore, since the data storage device 100 may quickly process write requests frequently received with respect to hot logical addresses, operation speed may be improved.

Meanwhile, when it is determined that the first write count of the target logical zone does not exceed the first reference value or the second write count of the target logical region group does not exceed the second reference value, the processor 110 may determine the data write-requested with respect to the target logical region, as normal data. The processor 110 may store normal data in a normal memory region 132 of the nonvolatile memory device 130.

Since the processor 110 may count the write counts of the first and second tables 121 and 122 each time a write request is received and may determine whether corresponding data is hot data, based on the write counts, it is not necessary to separately manage information on hot logical addresses. Further, the processor 110 may efficiently utilize the limited memory space of the working memory device 120 by managing write counts for logical regions in units of logical zones LZ and in units of logical region groups LG, through the first and second tables 121 and 122.

According to an embodiment of the present invention, the processor 110 may determine whether the amount of data write-requested with respect to a target logical region is less than a threshold amount, before counting a write count. When it is determined that the amount of the write-requested data is less than the threshold amount, the processor 110 may count first and second write counts in the first and second tables 121 and 122. When it is determined that the size of the write-requested data is greater than or equal to the threshold amount, the processor 110 may not count first and second write counts in the first and second tables 121 and 122.

Meanwhile, if the first and second tables 121 and 122 are managed for a long time, because write counts continuously accumulate, the processor 110 may downwardly adjust the write counts of the first and second tables 121 and 122 with an appropriate cycle.

According to an embodiment of the present invention, the processor 110 may increase a write request count each time a write request is received. The processor 110 may determine whether a write request count has reached a threshold request count. When it is determined that a write request count has reached the threshold request count, the processor 110 may downwardly adjust the write counts stored in the entries included in at least one of the first and second tables 121 and 122, that is, may decrease the write counts by an adjustment value or reset the write counts.

According to an embodiment of the present invention, when the number of entries storing write counts that exceed a reference value, among the n+1 number of entries included in the first table 121, has reached a threshold entry number, the processor 110 may downwardly adjust the write counts stored in the entries included in at least one of the first and second tables 121 and 122, that is, may decrease the write counts by an adjustment value or reset the write counts. The reference value may be the same as the first reference value for determining hot data, or may be another appropriate value.

According to an embodiment of the present invention, the processor 110 may receive an invalidation command for a logical region. The invalidation command may be used to notify the data storage device 100 that the external device will not use a specified logical region (or a logical address corresponding to a specified logical region) any more. When an invalidation command for a specified logical region is received, the processor 110 may downwardly adjust at least one of write counts corresponding to a logical zone LZ and a logical region group LG including the specified logical region in the first and second tables 121 and 122, that is, may decrease at least one of the write counts by an adjustment value or reset at least one of the write counts.

According to an embodiment of the present invention, the processor 110 may manage an erase count by counting an erase operation. The processor 110 may determine whether an erase count has reached a threshold erase count. When it is determined that an erase count has not reached the threshold erase count, the processor 110 may reserve the determination of whether the write counts included in the first and second tables 121 and 122 exceed the first and second reference values. When it is determined that an erase count has reached the threshold erase count, the processor 110 may determine whether the write counts included in the first and second tables 121 and 122 exceed the first and second reference values. That is to say, after it is determined based on an erase count that data are sufficiently stored in the nonvolatile memory device 130, the processor 110 may identify hot data. A unit of a memory region by which an erase count is managed may be, for example, a memory block or a memory device, and it is to be noted that the embodiments are not limited by these options.

The working memory device 120 may store programs, program data, parameters, and so forth, which are driven by the processor 110 to control the data storage device 100. The working memory device 120 may store the first table 121 and the second table 122 which are managed by the processor 110. The working memory device 120 may be, for example, a volatile memory device such as a DRAM and an SRAM.

The nonvolatile memory device 130 may perform a write operation for storing data, according to the control of the processor 110. The nonvolatile memory device 130 may include the hot memory region 131 and the normal memory region 132.

Figure 3A:
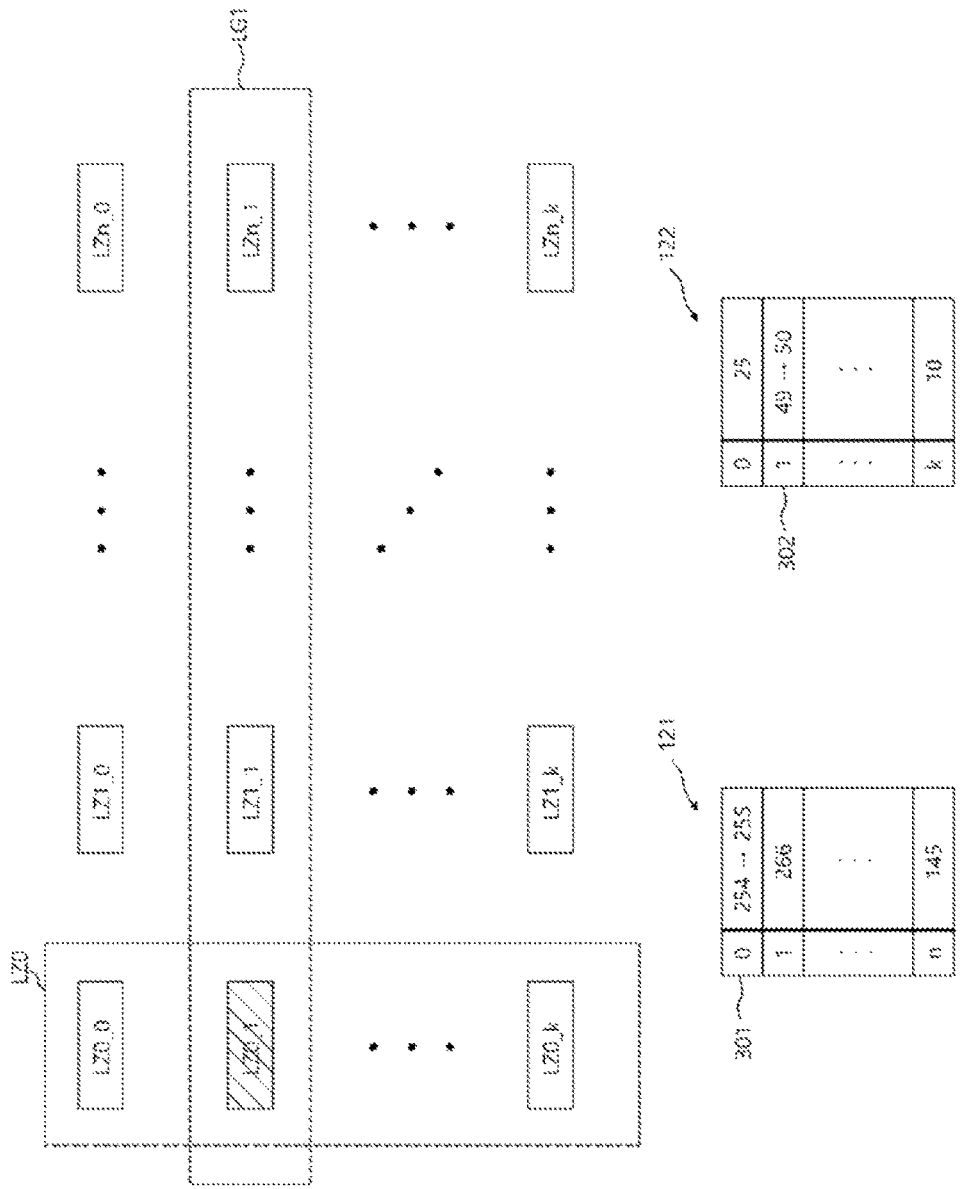

FIGS. 3A and 3B are diagrams exemplarily Illustrating a method for the processor 110 shown in FIG. 1 to determine write-requested data as hot data through management of first and second tables 121 and 122. The first table 121 may include the n+1 number of entries respectively corresponding to the n+1 number of logical zones LZ0 to LZn. The second table 122 may include the k+1 number of entries respectively corresponding to the k+1 number of logical region groups LG0 to LGk.

Hereinbelow, a method for operating the processor 110 will be described in detail with reference to FIGS. 1 to 3B.

Referring to FIG. 3A, the data storage device 100 may receive a write request for the logical region LZ0_1.

The processor 110 may increase the write count stored in an entry 301 of the first table 121, corresponding to the target logical zone LZ0 including the target logical region LZ0_1. Further, the processor 110 may increase the write count stored in an entry 302 of the second table 122, corresponding to the target logical region group LG1 including the target logical region LZ0_1.

The processor 110 may determine whether the write count "255" corresponding to the target logical zone LZ0 exceeds the first reference value and whether the write count "50" corresponding to the target logical region group LG1 exceeds the second reference value. In FIG. 3A, it will be assumed that the first reference value and the second reference value are respectively 250 and 50.

The processor 110 may determine that the write count "255" corresponding to the target logical zone LZ0 exceeds the first reference value and that the write count "50" corresponding to the target logical region group LG1 does not exceed the second reference value. Accordingly, the processor 110 may determine the data write-requested with respect to the target logical region LZ0_1 as normal data, and store the data in the normal memory region 132.

Referring to FIG. 3B, the data storage device 100 may receive a write request for the logical region LZ1_1.

The processor 110 may increase the write count stored in an entry 303 of the first table 121, corresponding to the target logical zone LZ1 including the target logical region LZ1_1. Further, the processor 110 may increase the write count stored in an entry 304 of the second table 122, corresponding to the target logical region group LG1 including the target logical region LZ1_1.

The processor 110 may determine whether the write count "267" corresponding to the target logical zone LZ1 exceeds the first reference value and whether the write count "51" corresponding to the target logical region group LG1 exceeds the second reference value. In FIG. 3B, it will be assumed that the first reference value and the second reference value are respectively 250 and 50.

The processor 110 may determine that the write count corresponding to the target logical zone LZ1 exceeds the first reference value and that the write count corresponding to the target logical region group LG1 exceeds the second reference value. Accordingly, the processor 110 may determine the data write-requested with respect to the target logical region LZ1_1 as hot data, and store the data in the hot memory region 131.

FIG. 4 is a flow chart for describing an operation of the data storage device 100 shown in FIG. 1.

At step S110, the data storage device 100 may receive a write request for a target logical region.

At step S120, the processor 110 may increase a first write count stored in an entry of the first table 121, corresponding to a target logical zone including the target logical region. The first table 121 may include a plurality of entries respectively corresponding to a plurality of logical zones.

At step S130, the processor 110 may increase a second write count stored in an entry of the second table 122, corresponding to a target logical region group Including the target logical region. The second table 122 may include a plurality of entries respectively corresponding to a plurality of logical region groups. The target logical region group may include logical regions which have the same offset value as the offset value of the target logical region, in the respective logical zones. The entry corresponding to the target logical region group may correspond to logical regions which have the same offset value as the offset value of the target logical region, in the respective logical zones.

At step S140, the processor 110 may determine whether the first write count of the target logical zone exceeds a first reference value. When it is determined that the first write count of the target logical zone exceeds the first reference value (YES), the process may proceed to step S150.

At the step S150, the processor 110 may determine whether the second write count of the target logical region group exceeds a second reference value. When it is determined that the second write count of the target logical region group exceeds the second reference value (YES), the process may proceed to step S160.

At step S160, the processor 110 may determine the data write-requested with respect to the target logical region as hot data, and store the data in the hot memory region 131.

Meanwhile, when it is determined at step S140 that the first write count of the target logical zone does not exceed the first reference value (NO), the process may proceed to step S170.

Further, when it is determined at step S150 that the second write count of the target logical region group does not exceed the second reference value (NO), the process may proceed to the step S170.

At the step S170, the processor 110 may determine the data write-requested with respect to the target logical region as normal data, and store the data in the normal memory region 132.

FIG. 5 is a flow chart for describing an operation of the data storage device 100 shown in FIG. 1. The process shown in FIG. 5 may be substantially similar to the process shown in FIG. 4 except step S220. Step S210 of FIG. 5 may be substantially the same as the Jo step S110 of FIG. 4, and steps S230 to S280 of FIG. 5 may be substantially the same as the steps S120 to S170 of FIG. 4, respectively.

At the step S220, the processor 110 may determine whether the amount of the data write-requested with respect to the target logical region is less than a threshold amount. When it is determined that the amount of the write-requested data is less than the threshold amount (YES), the process may proceed to step S230. When it is determined that the amount of the write-requested data is greater than or equal to the threshold amount (NO), the process may end.

Figure 6:
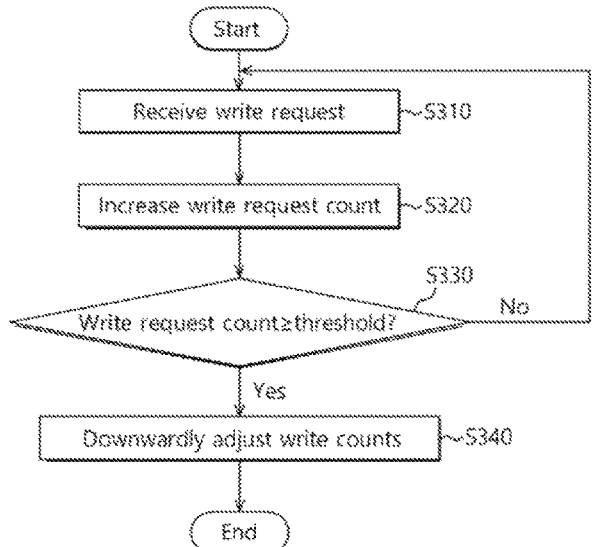
FIGS. 6 to 8 are flow charts of methods for describing an operation of the data storage device shown in FIG. 1.
Figure 7:
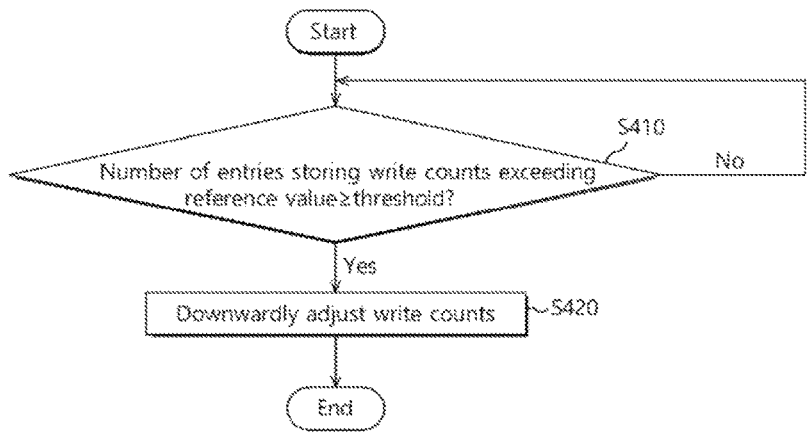
Figure 8:
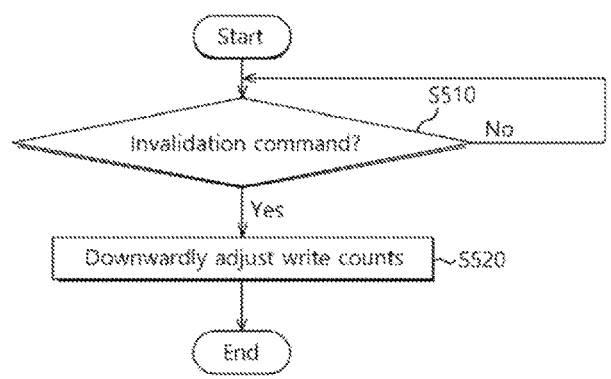

FIGS. 6 to 8 are flow charts for describing an operation of the processor 110 shown in FIG. 1. FIGS. 6 to 8 respectively shows cases where write counts accumulated in first and second tables 121 and 122 are downwardly adjusted.

Referring to FIG. 6, at step S310, the data storage device 100 may receive a write request for a target logical region.

At step S320, the processor 110 may increase a write request count.

At step S330, the processor 110 may determine whether the write request count has reached a threshold request count. When it is determined that the write request count has reached the threshold request count (YES), the process may proceed to step S340. When it is determined that the write request count has not reached the threshold request count (NO), the process may return to the step S310.

At the step S340, the processor 110 may downwardly adjust the write counts stored in the entries included in at least one of the first and second tables 121 and 122, that is, may decrease the write counts by an adjustment value or reset the write counts. The processor 110 may reset the write request count after adjusting the write counts.

Referring to FIG. 7, at step S410, the processor 110 may determine whether the number of entries storing write counts that exceed a reference value, among the entries included in the first table 121, has reached a threshold entry number. When it is determined that the number of the entries storing the write counts that exceed the reference value has reached the threshold entry number (YES), the process may proceed to step S420. When it is determined that the number of the entries storing the write counts that exceed the reference value has not reached the threshold entry number (NO), the processor 110 may repeat the determination step S410.

At the step S420, the processor 110 may downwardly adjust the write counts stored in the entries included in at least one of the first and second tables 121 and 122, that is, may decrease the write counts by an adjustment value or reset the write counts.

Referring to FIG. 8, at step S510, the processor 110 may determine whether an invalidation command for a specified logical region is received. When it is determined that the invalidation command for a specified logical region is received (YES), the process may proceed to step S520. When it is determined that the invalidation command for a specified logical region is not received (No), the processor 110 may repeat the determination step S510.

At step S520, the processor 110 may downwardly adjust at least one of write counts corresponding to a logical zone and a logical region group including the specified logical region, that is, may decrease at least one of the write counts by an adjustment value or reset at least one of the write counts.

FIG. 9 is a flow chart for describing an operation of the data storage device 100 shown in FIG. 1. The process shown in FIG. 9 may be substantially similar to the process shown in FIG. 4, except step S640. Steps S610 to S630 of FIG. 9 may be substantially the same as the steps S110 to S130 of FIG. 4, respectively, and steps S650 to S680 of FIG. 9 may be substantially the same as the steps S140 to S170 of FIG. 4, respectively.

Referring to FIG. 9, at the step S640, the processor 110 may determine whether an erase count has reached a threshold erase count. When it is determined that the erase count has reached the threshold erase count (YES), the process may proceed to the step S650. When it is determined that the erase count has not reached the threshold erase count (NO), the process may end. That is to say, when it is determined that the erase count has not reached the threshold erase count, the processor 110 may reserve the determination of whether the first and second write counts exceed the first and second reference values. When it is determined that the erase count has reached the threshold erase count, that is, when it is determined based on the erase count that data are sufficiently stored in the nonvolatile memory device 130, the processor 110 may identify and store hot data. An erase count may be counted, for example, by units of memory block and/or by units of memory devices.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device comprising:
a plurality of logical zones, wherein each logical zone includes a plurality of logical regions with a different offset value for each logical region;
a plurality of logical region groups, wherein each of the logical region group comprises logical regions in the logical zones that have the same offset value; and
a processor configured to, when receiving a write request for a target logical region, increase a first access count stored in a first entry of a first table, corresponding to a logical zone including the target logical region, and increase a second access count stored in a second entry of a second table, corresponding to a logical region group including the target logical region.

2. The data storage device according to claim 1, wherein the processor determines whether the first access count exceeds a first reference value and determines whether the second access count exceeds a second reference value, and judges data write-requested with respect to the target logical region as hot data according to determination results.

3. The data storage device according to claim 2, wherein the processor determines whether an erase count reaches a threshold erase count, and reserves determination of whether the first access count exceeds the first reference value and determination of whether the second access count exceeds the second reference value, when the erase count is determined to reach the threshold erase count.

4. The data storage device according to claim 1, wherein logical regions having the same offset value in the respective logical zones are grouped into one logical region group.

5. The data storage device according to claim 1, wherein the first table includes a number of entries corresponding to a number of logical zones.

6. The data storage device according to claim 1, wherein the second table includes a number of entries corresponding to a number of logical region groups.

7. The data storage device according to claim 1, wherein the processor determines whether an amount of the data write-requested with respect to the target logical region is less than a threshold amount, and increases the first and second access counts when the amount of the data is less than the threshold amount.

8. The data storage device according to claim 1, wherein the processor increases a write request count when receiving the write request, determines whether the write request count reaches a threshold request count, and downwardly adjusts access counts stored in the entries included in at least one of the first and second tables, when the write request count is determined to reach the threshold request count.

9. The data storage device according to claim 1, wherein the processor determines whether a number of entries storing access counts that exceed a reference value, among the entries included in the first table, reaches a threshold entry number, and downwardly adjusts access counts stored in the entries included in at least one of the first and second tables, when the number of entries are determined to reach the threshold entry number.

10. The data storage device according to claim 1, wherein, when receiving an invalidation command for the target logical region, the processor downwardly adjusts at least one of the first and second access counts.

11. A method for operating a data storage device including a plurality of logical zones, each logical zone includes a plurality of logical regions with a different offset value for each logical region, and a plurality of logical region groups, wherein each of the logical region group comprises logical regions in the logical zones that have the same offset value, the method comprising:
receiving a write request for a target logical region;
increasing a first access count stored in an entry of a first table, corresponding to a logical zone including the target logical region; and
increasing a second access count stored in an entry of a second table, corresponding to a logical region group including the target logical region.

12. The method according to claim 11, further comprising:
determining whether the first access count exceeds a first reference value;

determining whether the second access count exceeds a second reference value;

judging data write-requested with respect to the target logical region as hot data, based on determination results for the first and second access counts; and storing the hot data in a hot memory region.

13. The method according to claim 12, further comprising:

determining whether an erase count reaches a threshold erase count, wherein, when the erase count is determined to reach the threshold erase count, the determining of whether the first access count exceeds the first reference value and the determining of whether the second access count exceeds the second reference value are reserved.

14. The method according to claim 11, wherein logical regions having the same offset value in the respective logical zones are grouped into one logical region group.

15. The method according to claim 11, wherein the first table includes a plurality of entries corresponding to the logical zones.

16. The method according to claim 11, wherein the second table includes a plurality of entries corresponding to the logical region groups.

17. The method according to claim 11, further comprising:

determining whether an amount of the data write-requested with respect to the target logical region is less than a threshold amount, wherein, when the amount of the data write-requested is less than the threshold amount, the increasing of the first access count and the increasing of the second access count are reserved.

18. The method according to claim 11, further comprising:

increasing a write request count;

determining whether the write request count reaches a threshold request count; and downwardly adjusting access counts stored in the entries included in at least one of the first and second tables when the write request count is determined to reach the threshold request count.

19. The method according to claim 11, further comprising:

determining whether a number of entries storing access counts that exceed a reference value, among the entries included in the first table, reaches a threshold entry number; and downwardly adjusting access counts stored in the entries included in at least one of the first and second tables when the number of entries are determined to reach the threshold entry number.

20. The method according to claim 11, further comprising:

determining whether an invalidation command for the target logical region is received; and downwardly adjusting at least one of the first and second access counts when the invalidation command for the target logical region is received.

21. A data storage device comprising:

a nonvolatile memory having a plurality of logical memory zones wherein each logical memory zone includes a plurality of logical regions with a different offset value for each logical region, and a plurality of logical region groups, wherein each of the logical region group comprises logical regions in the logical zones that have the same offset value;

a working memory having first and second tables including address mapping information on the plurality of logical memory zones, wherein the first table includes a plurality of entries corresponding to the logical memory zones and the-second table includes a plurality of entries corresponding to the logical region groups; and a processor configured to, when receiving a write request for a target logical region, increase a first access count stored in the first table, corresponding to a logical memory zone including the target logical region, increase a second access count stored in the second table, corresponding to a logical region group including the target logical region, and determine whether the first write count and the second write count exceed a first reference value and a second reference value, respectively.

22. The data storage device according to claim 21, wherein, when the first write count is determined to exceed the first reference value, the processor determines write-requested data with respect to the target logical region as hot data and stores the data in a hot memory region.

23. The data storage device according to claim 21, wherein, when the second write count is determined to exceed the second reference value, the processor determines write-requested data with respect to the target logical region as hot data and stores the data in a hot memory region.

* * * * *